July 22, 1958  R. R. KELLER  2,843,889
DECORATIVE MOLDING STRIPS AND THE LIKE
Filed Nov. 4, 1955
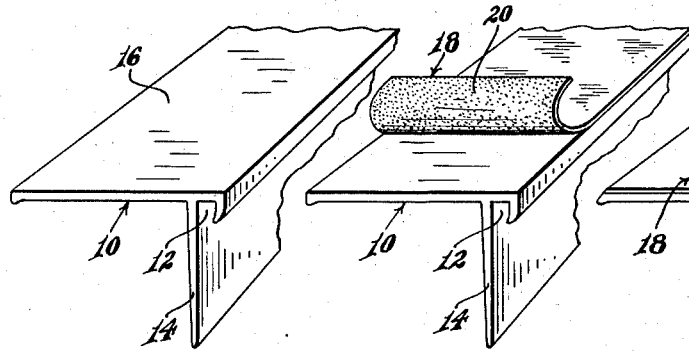
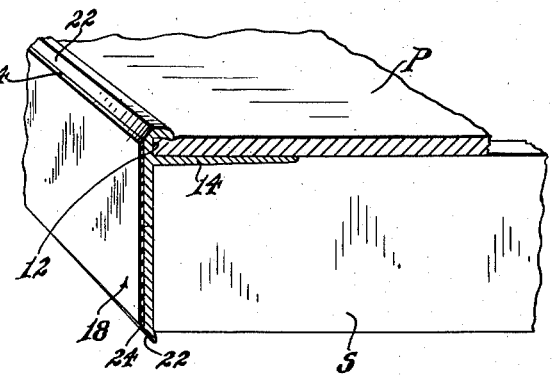
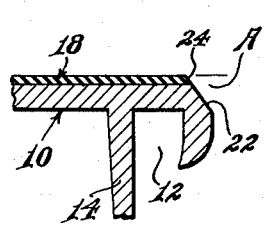
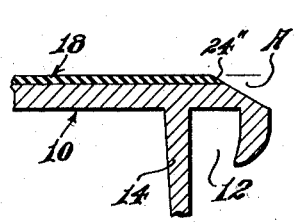
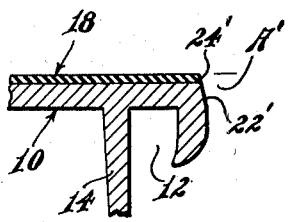
INVENTOR.
Robert R. Keller
BY his

United States Patent Office 2,843,889
Patented July 22, 1958

2,843,889
DECORATIVE MOLDING STRIPS AND THE LIKE
Robert R. Keller, Manchester, N. H.
Application November 4, 1955, Serial No. 544,937
5 Claims. (Cl. 20—74)

This invention relates to improvements in decorative molding strips and more particularly to plastic-coated metallic molding strips whose coated surface portions provide durably attractive finish and decorative surfaces which may have any of numerous colors or color combinations, or design effects, to suit particular needs or individual desires. The invention provides improvements whereby the plastic coating of such moldings, applied in strip form, are more permanently associated with the metal and less likely to become marred at edge regions thereof, as compared with prior comparable moldings.

Metal molding strips have been used extensively as structural and decorative elements for building interiors, especially in connection with bars, counters, sinks, cabinets, tables, and the like. Wood and plastic molding strips are used to a considerable extent, but metal continues to be the preferred molding strip material.

However, modern trends to color and design effects in interior decorative motifs, have introduced problems in the metal molding strip art, in that it has been impractically difficult and expensive to produce metal molding strips capable of durably providing the wanted color and surface design effects: Painted and enameled metal surfaces, and even glazed surfaces, on such strips have proven unsatisfactory for various reasons.

It is among the objects of the invention to provide a metallic molding strip having a surface portion or portions decoratively faced with sheet-form plastic material which is bonded to the metal, portions of the facing and of the adjacent metal being shaped to provide a substantial metallic surface in protective relation to an edge portion of the facing.

Another object of the invention is to provide a metallic molding strip wherein a metallic surface portion is covered by and bonded to relatively thin sheet-form plastic material, an edge portion of the plastic covering sheet and an adjacent surface portion of the metallic strip having inclination relative to the general plane of the covering sheet such that said edge portion of the covering sheet is relieved of impacts by an impact-deflecting relationship of said adjacent metallic surface.

A further object of the invention is to provide a metallic molding strip wherein a metallic surface portion is decoratively faced with sheet-form plastic material which is adhered to the metal and wherein adjacent portions of the plastic material and the metal strip at opposite edges of the facing have inclination relative to the general plane of the facing such that the inclined metal portion protectively deflects impacts away from the adjacent inclined portion of the facing.

It is, moreover, my purpose and object generally to improve molding strips and more especially such molding strips of metal having sheet-form plastic facing material bonded thereto.

In the accompanying drawing:

Fig. 1 is a perspective view of a fragment of a metallic molding strip having a surface portion which is to be faced with sheet-form plastic material;

Fig. 2 is a view generally similar to Fig. 1 but showing sheet form plastic material adhered to one portion of a surface of the metal strip and separated from another portion of the same metal surface;

Fig. 3 is a view generally similar to Figs. 1 and 2 but showing a completed plastic faced molding strips embodying features of the invention;

Fig. 4 is a perspective view of a fragment of a counter top, or the like, having the faced molding strip of Fig. 3 embodied therein, portions being in cross-section;

Fig. 5 is a fragmentary cross-sectional detail of one bevelled portion of the Fig. 3 faced molding strip, on a larger scale;

Fig. 6 is a view generally similar to Fig. 5 but showing one angle of bevel which is not acceptable; and Fig. 7 is a similar view showing another angle of bevel which is not acceptable.

Referring to the drawings, the metal molding strip 10 may be considered representative of metal molding strips in general which may be of various cross-sectional shapes and designed to be mounted on a suitable supporting structure with at least one face of the strip serving as an exposed finish surface which may, for example, extend along the upper edge of a counter, a table, or the like. The illustrated metal strip 10 is adapted to engage over the edge of a counter-top panel, or other sheet element, a fragment of one of which is indicated at P in Fig. 4, with the edge margin of the panel entering the groove or channel 12 which extends from end to end of strip 10. The strip part 14 provides one wall of channel 12 and has substantial width for strengthening the channel wall as well as serving as a means by which strip 10 may be secured in place on a suitable supporting structure S.

The invention is primarily concerned with decorative treatment of the face 16 of strip 10 which is to provide a finish surface extending along the top of the counter substantially at right angles to the strip part 14. The decoraitve treatment of face 16 involves applying a relatively thin facing strip 18 of plastic sheet material in covering relation to the entire area of the face 16 of strip 10 in its condition as shown in Figs. 1 and 2. Facing strip 18 is bonded to the metal face 16 by a suitable adhesive 20 in the presence of heat and pressure. The adhesive is shown in Fig. 2 applied to the facing strip 18 but it may be applied, if desired, to the metal surface 16.

Facing strip 18 preferably will be applied and bonded to metal surface 16 in a roller type press through which molding strips 10, of predetermined length, may be advanced in succession. Cost factors in the highly competitive molding strip art make it essential that the facing strips 18 be applied to the metal strips 10 at a relatively rapid rate, such as while the strips 10 are advancing through the press at a rate which may be as high as 80 to 100 feet per minute, or even higher.

Experience has demonstrated, however, that facing strips 18 bonded to the metal at 16 with any of the more effective and efficient available adhesives become loosened, chipped or otherwise marred in service, particularly at edge portions of the facings 18. Notwithstanding the attainment of a high type of bond between the metal and the facing sheets, the conventional faced molding strips, trimmed at their edges approximately at right angles to the plane of the facing, have been incapable of withstanding the stresses and impacts to which they are subjected in service. The facings frequently have become loosened, chipped or marred, usually at an unprotected edge portion of the facing. Procedures and devices for getting metal into covering relation to the edges of the facing strip involve prohibitive production costs due in part to needed slow-down of feed of the strips.

The problem has been simply yet effectively solved by providing a predetermined bevelling of both the metal and the facing strip along one or both edges of the faced surface. It has been found that a special variety of rotary cutters, suitably disposed for acting on the faced strips delivering from the press, can effectively bevel the opposite linear side edges of the strips in planes which intersect each other while maintaining the previously mentioned rapid rate of advance of the strips. Also, the angle of bevelling may be precisely predetermined to meet the requirements as herein defined.

When the faced strip edges are square cut as in Fig. 2, the metal provides little or no protection for the edges of the strip 18. But, assuming thickness of the plastic facing of approximately .010", a bevel at an angle to the plane of facing 18 of from 40° to 70°, as in Figs. 3 and 5 where the angle A is approximately 53°, provides a relatively broad inclined metal surface at 22 adjacent to the similarly inclined relatively narrow edge surface 24 of facing 18, with the two surfaces 22, 24 in a relation such that the metal will tend to deflect impacts from the facing edge which itself is of a nature to deflect impacts. No substantial advantage is attained if the bevel is at an angle appreciably greater than 70°, as represented in Fig. 7, where angle A' approximates 75°. The facing edge 24', in Fig. 7, is at such an abrupt angle that it may be subjected to substantial shocks in direction tending to loosen or mar the facing edge. Also, the adjacent metal surface 22' in Fig. 7 provides little or no protection for the facing edge.

On the other hand, if the bevel is at an angle substantially less than 40°, such as an angle of 30° as shown at A" in Fig. 6, the outer portion of the facing edge frequently becomes objectionably reduced or feathered and the facing edge 24" as a whole, in every case, becomes so broadened that the facing edge detracts from a desired substantial continuity of the facing effect outward to the adjacent metal. In other words, the facing edge under the Fig. 6 conditions produces an objectionable relatively broad band adjacent to the metal which will not have the color and finish aspects of the main area of the facing strip 18. Also, the glue line becomes objectionably exposed and usually appears as a detracting wavy line.

Hence, for facings having thicknesses within the preferred range of .008" to .032", there is a range of bevel angles within which satisfactory results may be attained and beyond which, at either extremity of the range, deleterious results and effects will ensue. In connection with the Fig. 5 showing, the stated 40°-70° range for angle A provides satisfactory results. Obviously, relatively small deviation below 40° or above 70° provides less satisfactory results which in some cases might be considered passable.

Any of various available plastic sheet materials may be employed as the decorative facing strip 18, such as strips made of polyester resins and vinyl resins which may have desired moisture and acid resistance and resistance to surface wear and abrasion. These resins are obtainable in suitable strips in any of a variety of colors and surface designs capable of providing desired ornamental effects. Melamine resins and polyethylene resins also may be employed for the facings with satisfactory results. Any of the mentioned resins may be reinforced with paper, cotton fibres or glass fibres which fibres, when desired, may be in woven or matted condition.

The bonding adhesive 20 may be of any of a variety of available adhesives having the property of adhering strongly to metal. Contact type adhesives having a natural or synthetic rubber base have proven highly efficient and satisfactory, both with and without an added phenolic molecule. As previously indicated herein, the adhesive may be applied either to the metal surface which is to be faced or to the plastic facing material 18 as shown at 20 in Fig. 2.

It is intended that the patent shall cover, by suitable expression in the appended claims, whatever features of patentable novelty exist in the invention disclosed.

I claim as my invention:

1. A molding strip comprising a unitary metallic strip-form body and a relatively thin strip of relatively thin sheet material bonded to the metal as a decorative facing covering a predetermined substantial area of the metallic body, an edge portion of said metallic strip-form body extending beyond an adjacent edge of said facing strip, and said adjacent edge of the facing strip and adjacent metal of said extending edge portion of the metallic strip-form body being in a common plane which is inclined relative to the general plane of the facing strip and which intersects, at the facing side of the molding strip, a plane perpendicular to said general plane to provide an inclined molding strip edge surface composite of metal and facing material in which composite surface the area of the metal substantially exceeds the area of the facing material, the angle of inclination of said composite surface relative to said general plane of the facing strip being within an approximate range of 40 to 70 degrees.

2. A molding strip comprising a unitary metallic strip-form body and a relatively thin strip of relatively thin sheet material bonded to the metal as a decorative facing covering a predetermined substantial area of the metallic body, said metallic strip-form body and said facing strip extending in parallelism to an edge of the molding strip, and said edge of the molding strip being bevelled to provide an edge surface composite of metal and facing material, the said bevelled edge surface being in a plane which intersects, at the facing side of the molding strip, a plane perpendicular to the general plane of the facing strip, the area of facing material in said inclined composite surface being relatively little greater than the area of a square-cut edge of the facing strip and greatly exceeded by the area of metal in said beveled edge surface.

3. A molding strip comprising a metallic body and a relatively thin strip of relatively thin sheet material bonded to the metal as a decorative facing covering a predetermined area of the metallic body, said molding strip having opposite linear edge portions bevelled in intersecting planes and each said edge portion providing a surface composite of metal and facing material, the inclination of each said composite surface relative to the general plane of the facing strip providing an area of facing material in said composite surface less than one and one half times the area of a square-cut edge of the facing strip and substantially less than the area of metal in said composite surface.

4. A molding strip comprising a metallic body and a relatively thin strip of plastic sheet material bonded to the metal as a decorative facing covering a predetermined area of the metallic body, said facing strip having its opposite side edges bevelled in two intersecting planes, and adjacent metal of said body being bevelled in the same intersecting planes to provide oppositely inclined edge surfaces composite of facing material and metal in each of which the major portion of the width of the composite surface is of metal, the angle of inclination of each said composite surface relative to the general plane of said facing strip being of the order of from 40° to 70°.

5. A molding strip comprising a metallic body and a relatively thin strip of flexible material in sheet form adhesively secured as a facing in covering relation to a predetermined area of the metallic body, opposite edge portions of said molding strip being bevelled in intersecting planes to provide oppositely inclined edge surfaces composite of facing material and metal, each said composite surface having a relatively wide inclined surface portion of metal in protective relation to a relatively narrow similarly inclined surface portion of facing material, the inclination of each of said composite edge surfaces relative to the general plane of said facing strip being of the order of from 40° to 70°.

References Cited in the file of this patent
UNITED STATES PATENTS

| | | |
|---|---|---|
| 2,030,730 | Wilson | Feb. 11, 1936 |
| 2,612,423 | Hennell | Sept. 30, 1952 |
| 2,705,820 | Torrence | Apr. 12, 1955 |
| 2,717,187 | Morgan et al. | Sept. 6, 1955 |
| 2,734,789 | Wilson | Feb. 14, 1956 |